(12) United States Patent
Kuenzi et al.

(10) Patent No.: US 9,438,585 B2
(45) Date of Patent: *Sep. 6, 2016

(54) TRUSTED VENDOR ACCESS

(71) Applicant: UTC FIRE & SECURITY CORPORATION, Farmington, CT (US)

(72) Inventors: Adam Kuenzi, Silverton, OR (US); Teri Lynne Briskey, Monmouth, OR (US); James Young, Salem, OR (US); Jonah J. Harkema, Newberg, OR (US); David Casey Fale, Portland, OR (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,668

(22) Filed: May 15, 2015

(65) Prior Publication Data

US 2015/0264037 A1 Sep. 17, 2015

Related U.S. Application Data

(63) Continuation of application No. 12/985,872, filed on Jan. 6, 2011, now Pat. No. 9,135,422.

(51) Int. Cl.
*H04L 29/06* (2006.01)
*G06F 21/34* (2013.01)
*H04L 29/08* (2006.01)

(52) U.S. Cl.
CPC .......... *H04L 63/083* (2013.01); *G06F 21/34* (2013.01); *H04L 67/10* (2013.01)

(58) Field of Classification Search
CPC . G06F 21/34; G07C 9/00571; G07F 7/1008; G07F 21/34; G06Q 20/341; H04L 63/083; H04L 67/10
See application file for complete search history.

(56) References Cited

U.S. PATENT DOCUMENTS

| | | | |
|---|---|---|---|
| 3,979,052 A | 9/1976 | Dettling et al. | |
| 4,060,846 A | 11/1977 | Conn | |
| 6,300,873 B1 | 10/2001 | Kucharczyk et al. | |
| 6,351,813 B1 * | 2/2002 | Mooney | G06F 12/1408 380/259 |
| 6,570,488 B2 | 5/2003 | Kucharczyk et al. | |
| 6,696,918 B2 | 2/2004 | Kucharczyk et al. | |
| 7,061,367 B2 | 6/2006 | Mosgrove et al. | |
| 7,193,503 B2 | 3/2007 | Fisher | |

(Continued)

FOREIGN PATENT DOCUMENTS

WO 03093997 A1 11/2003

OTHER PUBLICATIONS http://www.giac.org/paper/gsec/2948/controlling-remote-access-vendor-support/104954, Mark A. Cooper, 2003, pp. 1-19.

*Primary Examiner* — Chau Le
*Assistant Examiner* — Ghodrat Jamshidi
(74) *Attorney, Agent, or Firm* — Cantor Colburn LLP (57) ABSTRACT

A system is provided and facilitates management of a device by a first entity and management of a third entity by a second entity, wherein by way of the system access rights permitting access otherwise prevented by the device are assignable by the first entity to the second entity, the access rights are able to be administrated by the second entity to the third entity, and the access is obtainable by the third entity using a combination of the access rights and personal identification information to affect the device.

17 Claims, 5 Drawing Sheets

(56) References Cited

U.S. PATENT DOCUMENTS

| | | |
|---|---|---|
| 7,420,456 B2 | 9/2008 | Fisher |
| 7,624,280 B2 | 11/2009 | Oskari |
| 7,742,995 B2 | 6/2010 | Philips |
| 7,796,012 B2 | 9/2010 | Gerstenkom |
| 2001/0050615 A1 | 12/2001 | Kucharczyk et al. |
| 2002/0067261 A1 | 6/2002 | Kucharczyk et al. |
| 2003/0128101 A1* | 7/2003 | Long ................... G07F 9/00 340/5.26 |
| 2004/0025039 A1 | 2/2004 | Kuenzi et al. |
| 2004/0046018 A1 | 3/2004 | Dobbins |
| 2005/0027796 A1* | 2/2005 | San Andres .......... G06F 11/201 709/203 |
| 2005/0088279 A1* | 4/2005 | Denison ............. G07C 9/00309 340/5.23 |
| 2005/0168320 A1 | 8/2005 | Henderson et al. |
| 2006/0208852 A1 | 9/2006 | Wenzlik et al. |
| 2006/0212545 A1 | 9/2006 | Nicholes et al. |
| 2007/0296545 A1 | 12/2007 | Clare |
| 2008/0163361 A1 | 7/2008 | Davis et al. |
| 2008/0252415 A1 | 10/2008 | Larson et al. |
| 2009/0165146 A1 | 6/2009 | Wenzlik et al. |
| 2010/0176919 A1 | 7/2010 | Myers et al. |
| 2010/0305721 A1 | 12/2010 | Kostadinov et al. |
| 2011/0053557 A1* | 3/2011 | Despain ................ A47G 29/10 455/410 |
| 2011/0282833 A1 | 11/2011 | Ramsey et al. |

* cited by examiner

TRUSTED VENDOR ACCESS

CROSS-REFERENCE TO RELATED APPLICATION

This application is a continuation of U.S. Pat. No. 9,135,422, which was issued on Sep. 15, 2015. The entire contents of U.S. Pat. No. 9,135,422 are incorporated herein by reference.

BACKGROUND

The subject matter disclosed herein relates to trusted vendor access, a system to provide trusted vendor access and a method of providing trusted vendor access.

Traditionally, access control systems are managed centrally and both the means of access to secure resources and the persons who are allowed access to the secure resources is managed by the same organization. That is, when separate organizations are interacting within an access control system, it is often the case that only one of the organizations is involved in the management of the system. For example, many universities own and manage both the locks on campus doors and the cards that can access those locks. If a vendor organization requires access prevented by those locks, each vendor of the vendor organization must get a credential card from the university and be setup in the university system to gain the required access.

Over time this may lead to an unwieldy and cumbersome process if many vendor organizations, many sites, large geographical areas and other factors are involved. Additionally, adding and/or removing to and/or from the system a vendor organization or an individual vendor becomes a key management chore where the university (in this example) would need to make access control management tasks over time as vendor organizations and their associated vendors change.

Moreover, if a vendor organization intends to have access to secure resources of multiple universities, each of their associated vendors needs to be given access via the various universities respective systems. This means that each vendor needs to have multiple cards, one for each university the vendor organization intends to have access to. In a similar vein, if each vendor intends to be associated with multiple vendor organizations, he will, again, be required to carry multiple cards for the university (or universities) the multiple vendor organizations intend to have access to.

In addition, vendor access systems may be networked where a centralized database is used to manage the access control rights. When a card is presented to the lock, the lock communicates to the central database to verify access control rights before permitting access. However, some systems are 'offline' and therefore the cards that are permitted access must be prior programmed into the lock. If a card is to be added or removed, a programming step must be done to the lock to allow the card in.

In some improvements, a single-card programmed in the lock is replaced by a 'system code' that would allow any card from a particular organization to access the offline lock. However, this still has the limitation that if the vendors that may access the lock are to be changed, then the lock must be reprogrammed in order for the change to take effect.

Also, in patent application US 2006/0208852 A1, Wenzlik, et al., offer access delegated in code-based systems. In Wenzlik, a license is provided to an authorized person that allows them to generate codes based on their own schedule to gain access to a trusted resource but the access control managing organization must still manage individuals as opposed to organizations as a whole. They must still issue licenses to 'authorized persons' on an individual basis even though that authorized person can manage their own codes to a secure resource and, if new authorized persons require access, then the managing organization must still be involved to provide additional licenses.

Moreover, most current vendor access systems provide for first or at most second level access control. First level access control is characterized by the authorized person gaining access through something he/she knows (i.e., a code/PIN). Second level access control is characterized in that the authorized person gains access through something he/she carries (i.e., a credential). By contrast, third level access control is characterized in that the authorized person gain access through the use of a combination of something he/she knows and something he/she carries (i.e., a code/PIN associated with a credential). This level of access control is rarely offered with the current vendor access systems, however, due to the high level of programming demand that must be managed and memory requirements that must be provided to the various locking devices.

BRIEF DESCRIPTION

According to one aspect, a system is provided and facilitates management of a device by a first entity and management of a third entity by a second entity, wherein by way of the system access rights permitting access otherwise prevented by the device are assignable by the first entity to the second entity, the access rights are able to be administrated by the second entity to the third entity, and the access is obtainable by the third entity using a combination of the access rights and personal identification information to affect the device.

According to another aspect, a system is provided and facilitates management of a locking device preventing access to a secured resource by a lock owner and management of a trusted vendor possessing a portable device by a trusted vendor organization, wherein by way of the system access rights permitting access to the secured resource otherwise prevented by the locking device are assignable by the lock owner to the trusted vendor organization, the access rights are able to be administered by the trusted vendor organization to the trusted vendor, and access to the secured resource is obtainable by the trusted vendor using the portable device to unlock the locking device with a combination of the access rights and personal identification information.

According to yet another aspect, a system is provided and facilitates separate management of one or more locking devices preventing access to secured resources by one or more lock owners and separate management of one or more trusted vendors each of whom possesses a portable device by one or more trusted vendor organizations, wherein by way of the system access rights permitting access otherwise prevented by the one or more locking devices to the secured resources are assignable by the lock owners to the trusted vendor organizations, the access rights are able to be administered by the trusted vendor organizations to the trusted vendors, and access to the secured resources is obtainable by each of the one or more trusted vendors using the respective portable device to unlock the corresponding one or more locking devices with a combination of the access rights and personal identification information.

These and other advantages and features will become more apparent from the following description taken in conjunction with the drawings.

BRIEF DESCRIPTION OF THE DRAWINGS

The subject matter which is regarded as the embodiments is particularly pointed out and distinctly claimed in the claims at the conclusion of the specification. The foregoing and other features, and advantages are apparent from the following detailed description taken in conjunction with the accompanying drawings in which:

The detailed description explains embodiments, together with advantages and features, by way of example with reference to the drawings.

DETAILED DESCRIPTION

Figure 1:
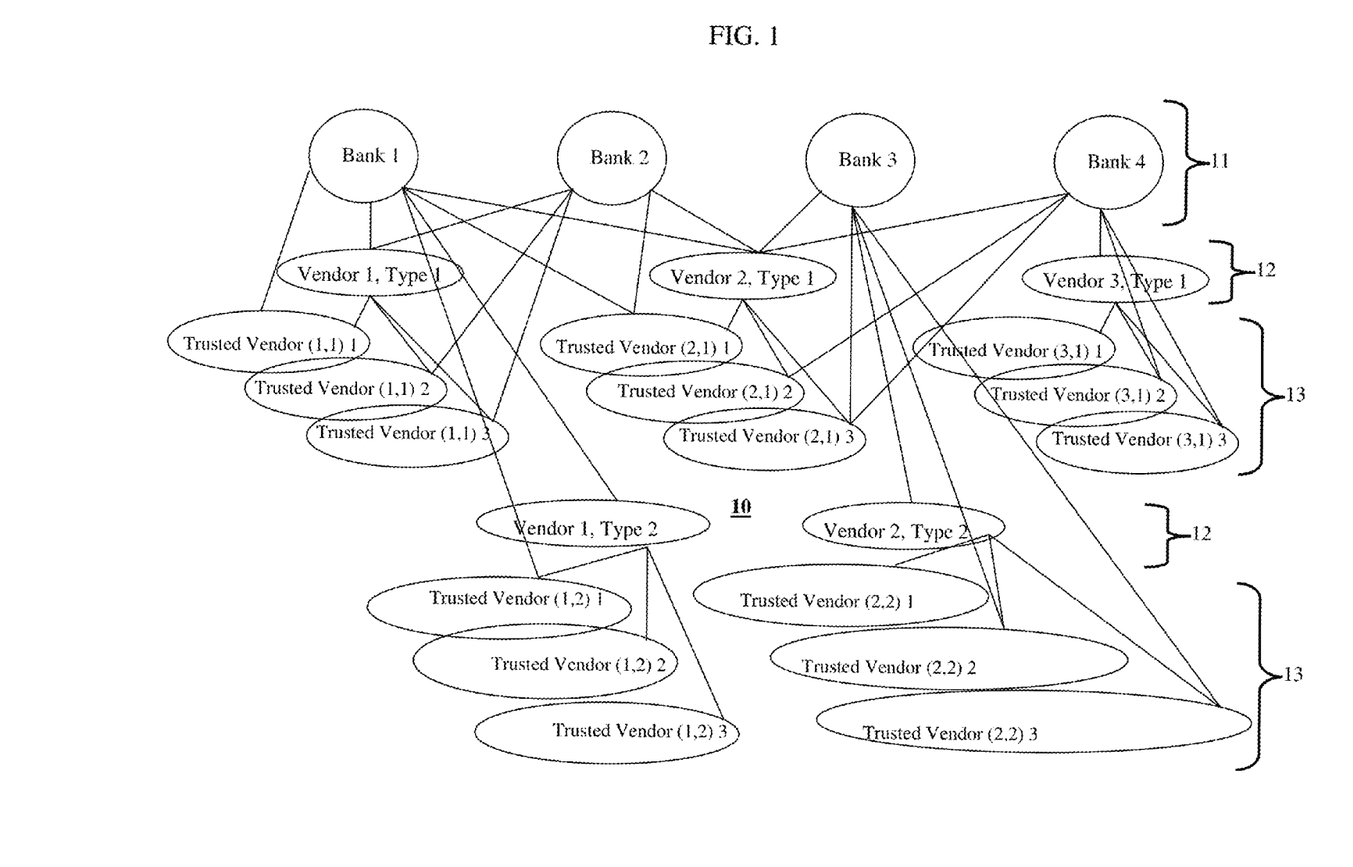
FIG. 1 is a schematic illustration of an environment in which a system for providing trusted vendor access to various separately managed devices is provided.

With reference to FIG. 1, a system 10 for providing trusted vendor access to various separately managed devices is provided. The system 10 includes first entities 11, second entities 12 and third entities 13. The first entities 11 separately manage the various separately managed devices, which may include locking devices or systems that prevent unauthorized access to secured resources. The second entities 12 separately manage the third entities 13 and the third entities perform services, operations or functions that require the third entities to have access rights permitting access to the secured resources and past the various separately managed devices. In accordance with an operation of the system 10, the first entities 11 assign access rights permitting access to the various separately managed devices to the second entities 12. The second entities 12, meanwhile, administer those access rights to the third entities 13 who are considered to be trusted vendors granted trusted vendor access.

As described above, trusted vendor access allows a second entity 12 to act as an entire organization to be 'trusted' and to be given the responsibility to manage the authorized third entities 13 within the organization. A first entity 11 can revoke a trust accorded to a second entity 12 at any time, and in so doing, disallow access to all of its third entities 13. Trusted vendor access does not require device/lock programming because each of the third entities 13 may carry, for example, a portable device that contains credential information that has all the information needed for a locking device to decide whether the third entity 13 should have access, by providing for delegation of access rights management to the second entities 12 and by allowing full offline and geographically distributed layouts of devices/locks. The first entities 11 may at any time change second entities 12 and remove permissions, which in turn would update any and all of the access control devices that the third entities 13 carry within a predefined time period. This predefined time period would be determined by how often a third entity 13 is required to synchronize their access control device with the system 10.

Thus, geographically distributed offline devices/locks, which are relatively inexpensive as compared to 'online' devices/locks, can be managed in a similar manner to 'online' devices/locks because third entities 13 can carry their access permissions with them so that locks do not need to be programmed and so that costs associated with such programming can be avoided. Moreover, while no limit exists as to the number of second entities 12 that can be involved with a particular first entity 11, the first entities 11 maintain control over relationships with the second entities 12 but are not required to manage the third entities 13 directly even in the absence of a centralized management entity.

Where the third entities 13 are considered to be trusted vendors, the second entities 12 include trusted vendor organizations and it is possible that multiple first entities 11 may assign their respective access rights to each one or more of the trusted vendor organizations and, similarly, the multiple second entities 12 administer the access rights to each one or more of the trusted vendors.

Figure 2:
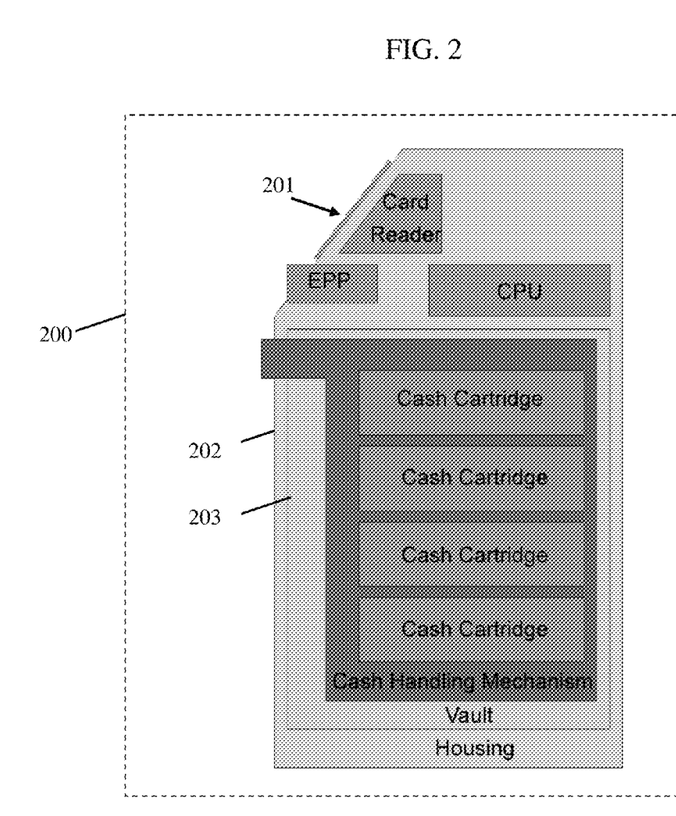
FIG. 2 is an exemplary resource to which managed devices are attached.

That is, as shown in FIGS. 1 and 2, separate banks 1-4 may separately manage one or more exemplary locking devices at each door, vault and automatic teller machine at each branch location and assign access rights permitting access to secured resources past those different types of locks to separate vendors of types 1 and 2. In particular, bank 1 may manage a door lock 200 granting access to an automatic teller machine 201 having a housing lock 202 and a vault lock 203. In this case and, in the embodiment of FIG. 1, Bank 1 assigns access rights to the "type 1" vendor organizations 1 and 2. These access rights afford the trusted vendors of these vendor organization access rights past the door lock 200 and the housing lock 202. Meanwhile, Bank 1 may also assign access rights to the "type 2" vendor organization 1 such that its trusted vendors are afforded access rights past the door lock 200 and the vault lock 203. In this way, the respective trusted vendors 1-3 of the "type 1" vendor organizations 1 and 2 can each be administered access rights to the housing of the automatic teller machine 201 for repair and service operations relating to the computing devices therein but will not have access to the vault since such access would represent a security risk. By contrast, the trusted vendors of the "type 2" vendor organization 1 can each be administered access rights to the vault for money delivery operations but will not have access to the housing. In any case, Bank 1 can be assured that their automatic teller machine gets service from the vendor organizations, and the vendor organizations can decide who from their organizations actually does the service.

Figure 3:
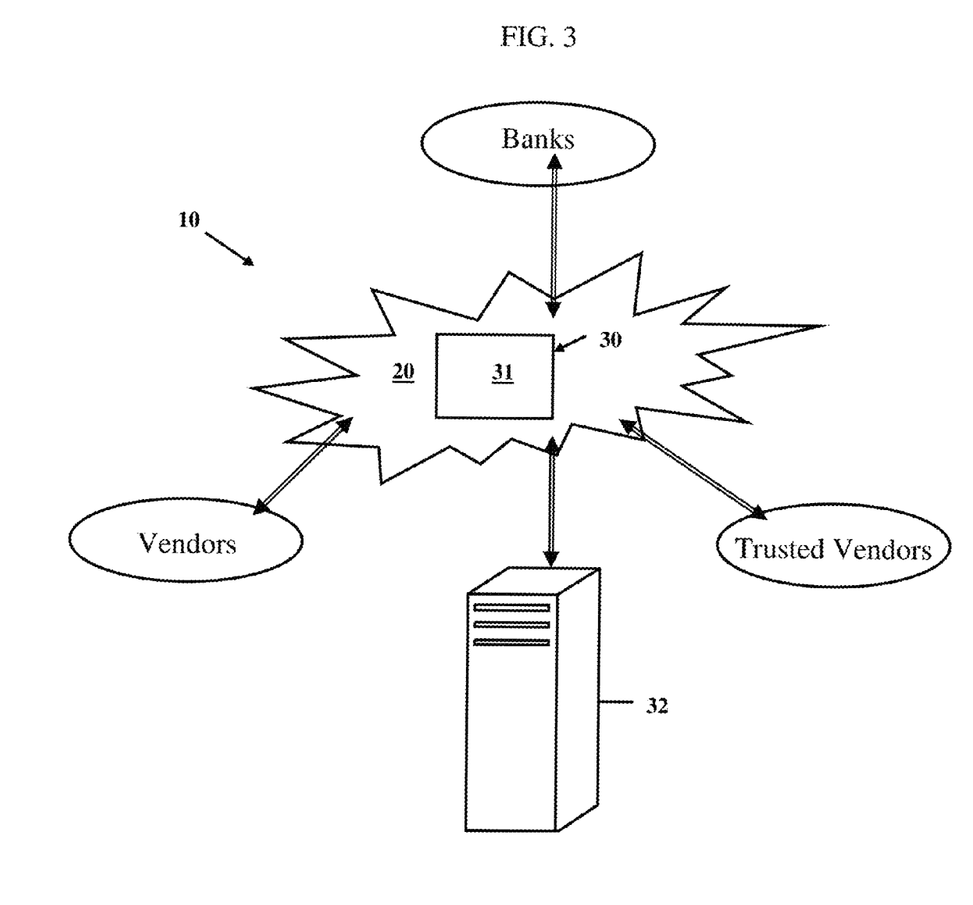
FIG. 3 is a further schematic illustration of the environment of FIG. 1.

With reference to FIG. 3, the system 10 may be distributed over a wired or wireless network 20, such as the Internet, by which the first, second and third entities 11, 12, 13 access a portal 30, which may be embodied as a collection of databases. Via this portal 30, the first entities 11 assign the access rights permitting access to the various separately managed devices to the second entities 12 whereas the second entities 12 administer the access rights to the third entities 13. These assignments and administrations can all be carried out and recorded in databases stored in computer readable media of a secure remote server 32.

In accordance with embodiments, the portal 30 may include a website 31 that is hosted on the secure remote server 32 or another similar server and the first, second and third entities 11, 12, 13 each may be granted access to unique pages of the website 31. In accordance with further embodiments, the website 31 may provide tracking information to the first, second and third entities 11, 12, 13. Thus, if a third entity 13 fails to provide adequate service upon being granted access rights to a secured resource, an associated second entity 12 can revoke his access rights and administer them to another. If, however, the second entity 12 fails to account for the poor performance, the first entity 11 can eventually revoke all access rights from the second entity 12 and grant them to another higher performing second entity 12. In so doing, the first entity 11 need not reprogram the actual locking devices it separately manages. Rather, the first entity 11 may simply update the access rights information via the portal 30.

Figure 4:
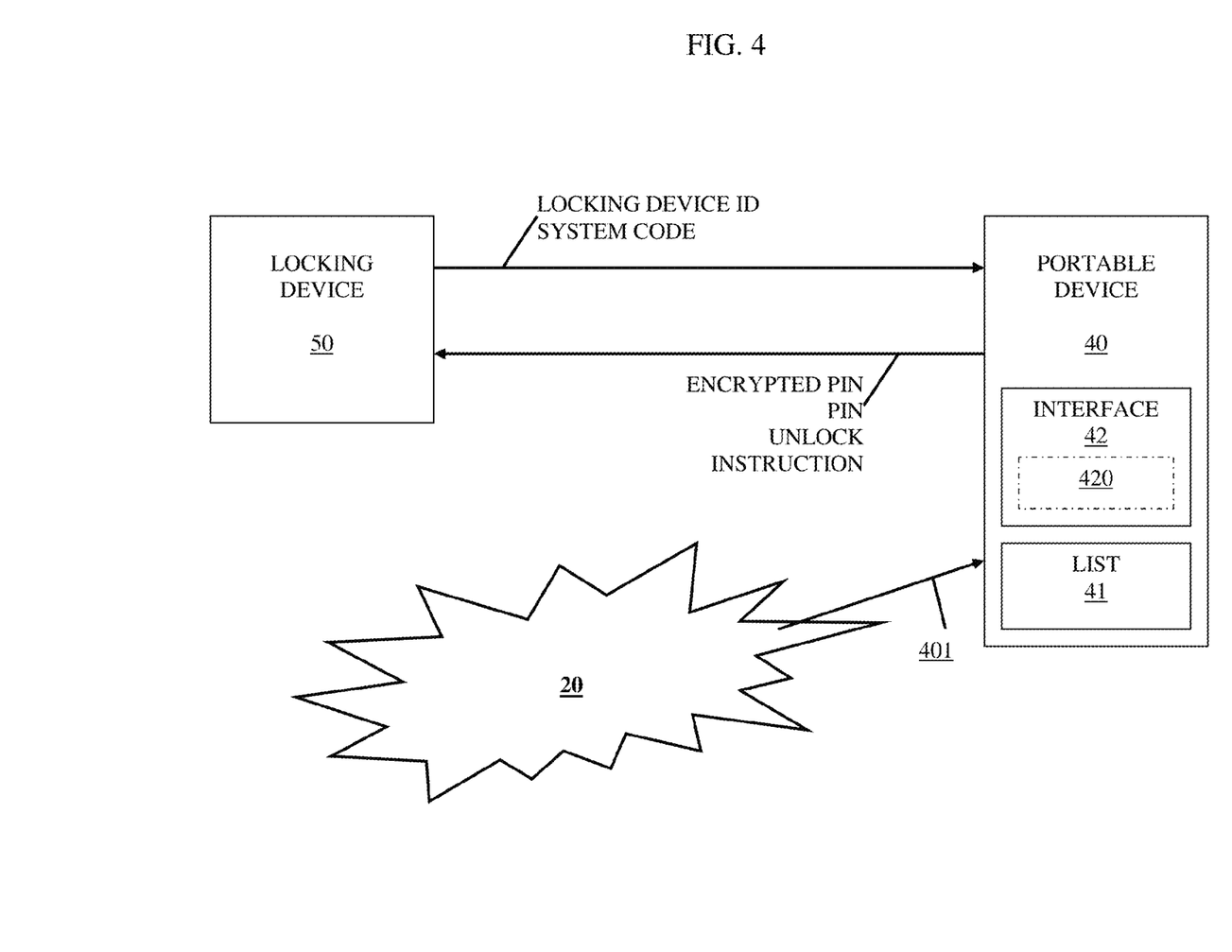
FIG. 4 is a schematic diagram illustrating an operation of the system.

With reference to FIG. 4, in order to perform his duties, each third entity 13 individual may carry with him a portable device 40 by which he can access information relating to the access rights administered to him from a second entity 12. The portable device 40 may be a display key, a swipe card, a magnetic stripe card, a contactless card, a cell phone, a mobile computer and/or a personal digital assistant. The individual should periodically (i.e., once daily) sync the portable device 40 with the network 20 in order to download the information relating to his access rights and the access rights themselves where those access rights expire and are reissued periodically (i.e., once daily).

In accordance with embodiments, the access rights may be administered to the individual as an impermanent access token 401 that is periodically updated and, in some cases, only updated once appropriate tracking data is provided to the system 10. This access token 401 may be passively or actively accessible and downloadable as different types of data packets via the network 20 whether the network 20 is wired or wireless. The access token 401 is then employed by the individual to gain access to a secured resource to which he has been administered access rights. In this way, an individual may need to periodically update his access tokens so that, when he encounters a locking device 50 preventing access to a secure resource to which he should have access rights, the individual can connect his portable device 40 to the locking device 50. Since the individual's portable device 40 includes the most recently reissued and currently valid access token, the locking device 50 need not carry this data or be reprogrammed every time the data changes.

Figure 5:
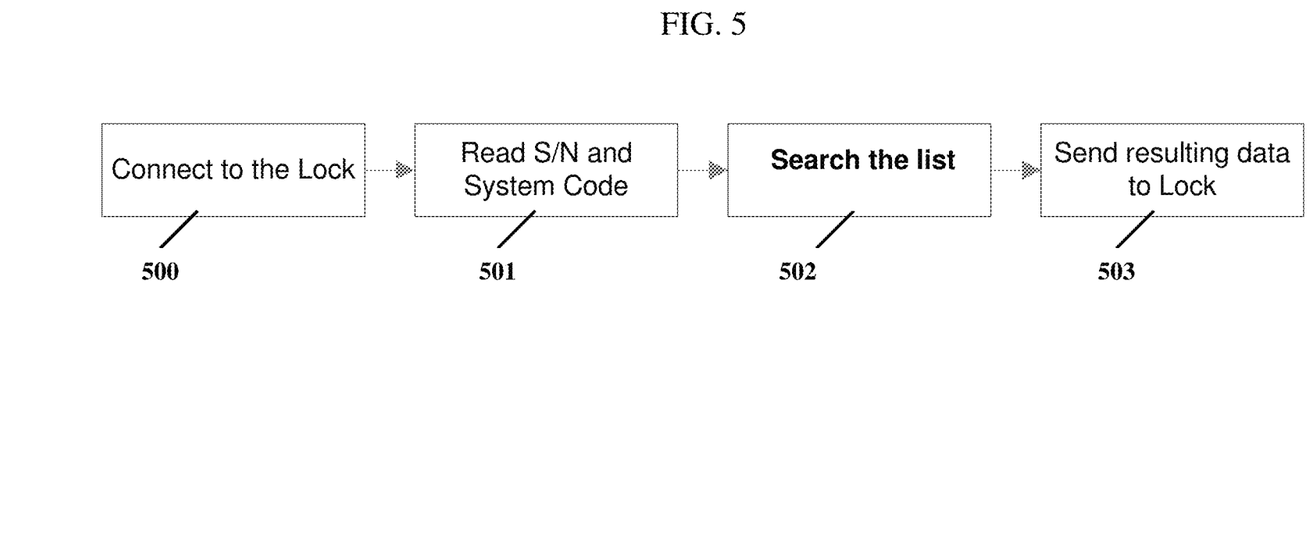
FIG. 5 is a flow diagram illustrating an operation of the system.

This process is shown schematically in FIGS. 4 and 5, which illustrate an operation of the system 10. As shown in FIGS. 4 and 5, the individual connects his portable device 40 to the locking device 50 by way of various wired or wireless connection modes (operation 500). The portable device 40 then determines an identification of the locking device 50 by accessing for example the locking device's serial number and the first entity's system code (operation 501). At this point, having downloaded or accessed the individual's currently valid access token(s) corresponding to the locking device 50, the portable device 40 searches through the data packet list 41, which is built by or as a result of the downloading of the access token 401, for data packets corresponding to the type of the locking device 50 (operation 502). Having identified the type of the locking device 50 and the appropriate data packet associated with that locking device type, the portable device 40 generates data reflective of the access token 401 and an encrypted version of the individual's personal identification information (i.e., a PIN number) in accordance with the type of the locking device 50. The portable device 40 then requests that the individual enter his pin via the interface 42 and subsequently inputs at least the personal identification information and the encrypted version thereof to the locking device 50 along with an instruction. Each of these elements is generated and formatted to be readable by the locking device 50 (operation 503) such that the locking device 50 can be effectively operated by the portable device 40. The instruction, therefore, may be an unlock instruction if the personal identification information matches the encrypted version thereof and the access token 401 is recognized by the locking device 50 as permitting the vendor access.

In an alternate embodiment, the portable device 40 requests that the individual enter his pin via the interface 42 with the subsequent input of at least the personal identification information and the encrypted version thereof to the locking device 50 along with an instruction being separate operations.

Thus, the system 10 provides for both credential and password protection of secured resources. That is, the access token acts as the individual's credential and, even though the individual may therefore present a valid credential, it remains necessary for the individual to enter his personal identification information to gain access. This way, should the individual misplace, lose or have the portable device 40 stolen, an unauthorized user who does not know the personal identification information will not be able to gain access.

The appropriate data packet may take several forms organized as at least first through fifth types. The first type specifies one type of lock to open and includes options information, start and end information for when the data packet is valid, encryption information and update codes. The second type specifies access to various locks having common system codes and includes options information, start and end information for when the data packet is valid, encryption information and update codes. The third type specifies access to various locks having common system codes but requires an update code that is locking device specific and further includes options information, start and end information for when the data packet is valid, encryption information and update codes. The fourth type specifies one type of box to open and includes options information, end information for when a data packet is valid and a variable information string 420. The fifth type specifies one type of box to open and includes options information, end information for when a data packet is valid, a variable information string 420 and encryption information.

The variable information string 420 provides variable types of information to the individual attempting to gain access to a secure resource. The variable types of information may include telephone numbers of a manager, instructions for how to complete a service call and/or additional access codes or information and may be displayed to the individual in various manners via at least the interface 42. This displaying may be made to the individual at the time of access or on demand.

While the embodiments have been described in detail, it should be readily understood that the description is not limited to such disclosed embodiments. Rather, the embodiments can be modified to incorporate any number of variations, alterations, substitutions or equivalent arrangements not heretofore described, but which are commensurate with the spirit and scope of the description. Additionally, while various embodiments have been described, it is to be understood that aspects may include only some of the described embodiments. Accordingly, the description is not to be seen as limited by the foregoing description.

The invention claimed is:

1. A system that facilitates management of a locking device by a first entity and management of a third entity by a second entity, the system comprising:
   a network; and
   a portal by which the first, second and third entities communicate with access to third entity performance tracking information, the portal being hosted by a server for distribution over the network, wherein by way of the system:
   access rights permitting access otherwise prevented by the locking device are assignable to and revocable from the second entity by the first entity based on a response of the second entity to the third entity performance tracking information,
   the access rights being administrated as an access token by the second entity to a portable device of the third entity via the portal,
   the portable device being configured to identify a type of the locking device and to search in a data packet list for a data packet corresponding to the type of the locking device, and
   the access is obtained by the third entity using data reflective of the access token and generated in accordance with the identified type of the locking device and personal identification information of the third entity to affect the locking device.

2. The system according to claim 1, wherein the locking device prevents unauthorized access to a secure resource.

3. The system according to claim 1, wherein by way of the system the first entity manages a plurality of locking devices.

4. The system according to claim 1, wherein the first, second and third entities each comprises a plurality of first, second and third entities, respectively.

5. The system according to claim 4, wherein by way of the system multiple first entities assign the access rights to each second entity and each second entity administers the access rights to multiple third entities.

6. The system according to claim 4, wherein by way of the system multiple second entities administer the access rights to each third entity and each third entity gains the access to locking devices of multiple first entities.

7. The system according to claim 1, wherein the first entity revokes access rights granted to the second entity in accordance with the second entity not accounting for a poor performance.

8. The system according to claim 7, wherein the access token is available upon upload of the tracking information.

9. The system according to claim 1, wherein the network comprises a wired or wireless network and the access token is accessible via the wired or a wireless network.

10. The system according to claim 1, wherein the access token is impermanent.

11. The system according to claim 10, wherein the third entity reacquires a newly issued access token at a predefined interval.

12. The system according to claim 10, wherein the third entity passively reacquires a newly issued access token.

13. The system according to claim 1, wherein the access token comprises variable information relating to the locking device, the variable information comprising telephone numbers, service call completion instructions and additional access codes.

14. The system according to claim 1, wherein the access token comprises an encrypted version of the personal identification information and the access token and the personal identification information are input to the locking device via a wired or wireless connection in a form readable by the locking device in accordance with the identified type of the locking device along with an unlock instruction in a form that is also readable by the locking device in accordance with the identified type of the locking device to be executed when the personal identification information matches the encrypted version thereof and when the access token is recognized by the locking device as permitting access.

15. A system that facilitates management by a lock owner of a first locking device and second locking devices, which are accessible via the first locking device, one of the second locking devices preventing access to a secured resource, the system further facilitating management by a trusted vendor organization of a trusted vendor possessing a portable device and comprising:
   a network; and
   a portal by which the first, second and third entities communicate with access to trusted vendor performance tracking information, the portal being hosted by a server for distribution over the network, wherein by way of the system:
   access rights permitting access to the secured resource otherwise prevented by the first locking device and access rights permitting access to the secured resource otherwise prevented by the one of the second locking devices are each respectively assignable and revocable by the lock owner to and from the trusted vendor organization based on a response of the trusted vendor organization to the trusted vendor performance tracking information,
   the portable device being configured to identify a respective type of the first and second locking devices and to search in a data packet list for respective data packets corresponding to the respective type of the first and second locking devices,
   the access rights are each respectively administered as corresponding access tokens by the trusted vendor organization to the portable device via the portal and
   access to the secured resource is obtainable by the trusted vendor using the portable device to unlock the first locking device and the one of the second locking devices with a combination of data reflective of the access tokens and generated in accordance with the identified respective types of the first and second locking devices and personal identification information.

16. The system according to claim 15, wherein the trusted vendor uses the portable device to determine the type of the first locking device and the one of the second locking devices and downloads each of the respective access rights as the access token to the portable device, the access token including:
   an encrypted version of the personal identification information, which is generated in a form associated with the locking device type to be readable by the first locking device and the one of the second locking devices; and
   an unlock instruction, which is generated in a form associated with the first and second locking device types to be readable by the first locking device and the one of the second locking devices, to be executed when the personal identification information matches the encrypted version thereof and when the access token is recognized by the first locking device and the one of the second locking devices as permitting access.

17. The system according to claim 15, wherein the one or more lock owners have no direct administration capability of the trusted vendors.

* * * * *